United States Patent [19]

Tsukui

[11] Patent Number: 4,788,418

[45] Date of Patent: Nov. 29, 1988

[54] AUTOMATIC TRANSACTION MACHINE

[75] Inventor: Setsuo Tsukui, Kawasaki, Japan

[73] Assignee: Fujitsu Limited, Kawasaki, Japan

[21] Appl. No.: 5,777

[22] Filed: Jan. 21, 1987

[30] Foreign Application Priority Data

Jan. 21, 1986 [JP] Japan .................................. 61-10866
Jan. 21, 1986 [JP] Japan .................................. 61-10867
Jan. 21, 1986 [JP] Japan .................................. 61-10868
Jan. 22, 1986 [JP] Japan .................................. 61-11667

[51] Int. Cl.$^4$ ............................................... G06F 15/30
[52] U.S. Cl. ...................................... 235/379; 235/380
[58] Field of Search ............. 235/379, 380, 382, 382.5

[56] References Cited

U.S. PATENT DOCUMENTS 4,575,622 3/1986 Pellegrini ......................... 235/382.5

*Primary Examiner*—Roy N. Envall, Jr.

*Attorney, Agent, or Firm*—Staas & Halsey

[57] ABSTRACT

An automatic transaction machine including reading device for reading data recorded in a transaction medium for an user, an operation guidance device for guiding an operation for the user, an input device for inputting necessary data input by the user according to the operation guidance device and a controller which selectively executes operation of the machine in a first input processing mode and in a second input processing mode in accordance with the read data. In the first mode, the controller controls the operation guidance device so that a transaction amount is input through the input means directly after a validity check of the read data without inputting a secret number for identifying the user. In the second mode, the controller controls the operation guidance device so that the transaction amount is input after inputting the secret number through the input device after the validity check.

12 Claims, 22 Drawing Sheets

Fig. 4(B)-I
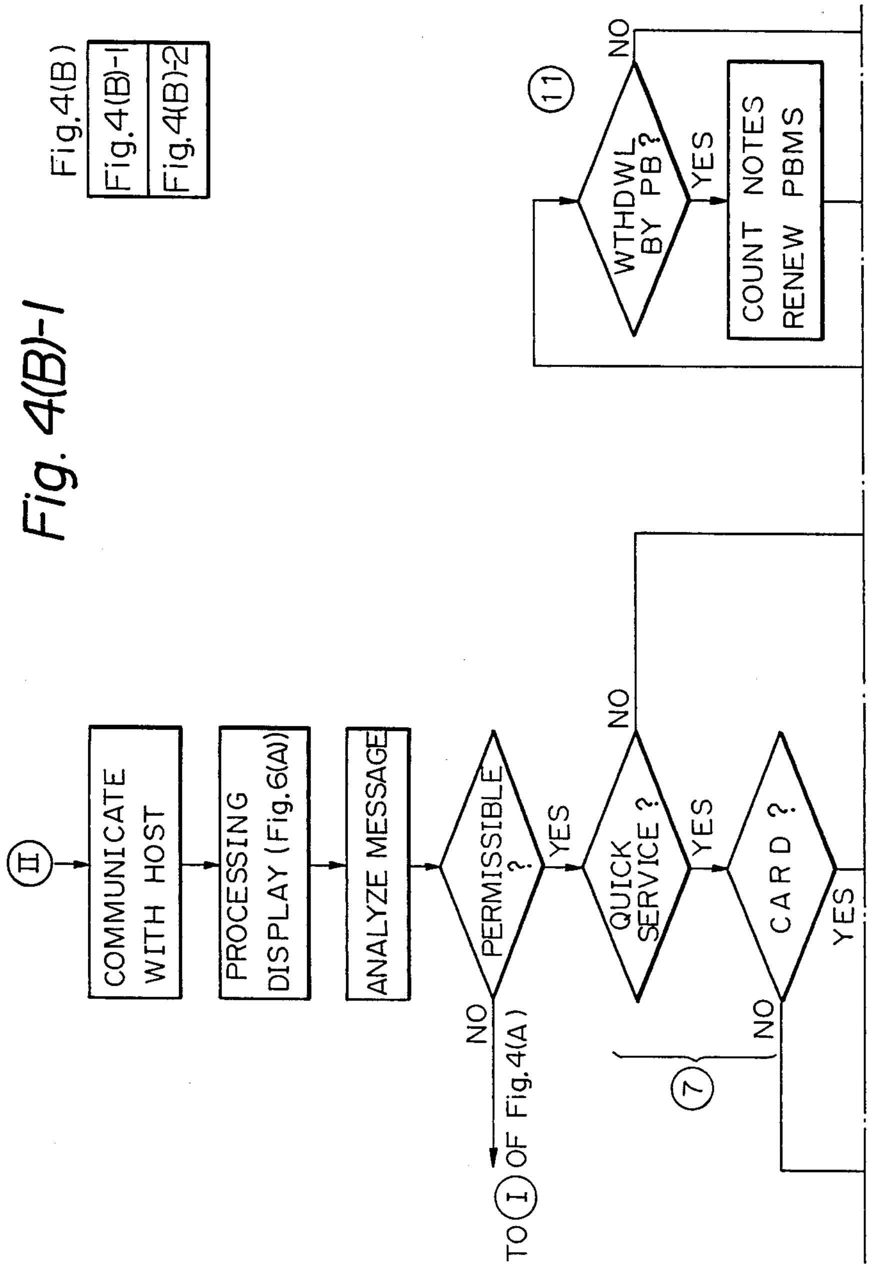

*Fig. 7(B)*

| | DATE | | WTHDWL | DEPOSIT | BALANCE | | |
|---|---|---|---|---|---|---|---|
| 1 | 850710 | N B | TRANSFER | 50,000 | 100,000 | | } FORMER DATA |
| 2 | 850712 | N B | 30,000 | ATM | 70,000 | | } |
| 3 | 850730 | | 10,000 | QUICK S. | BRIEF PRT. | | ← LATEST DATA |
| 4 | | | | | | | |
| 5 | | | | | | | |
| 6 | | | | | | | |
| 7 | | | | | | | |
| 8 | | | | | | | |
| 9 | | | | | | | |
| 10 | | | | | | | |
| 11 | | | | | | | |
| 12 | | | | | | | |
| 13 | | | | | | | |

AUTOMATIC TRANSACTION MACHINE

BACKGROUND OF THE INVENTION

1. Field of the Invention

The present invention relates to an automatic transaction machine by which transactions are automatically executed upon user operation, using a transaction medium such as a card or a passbook. In particular, it relates to an improved structure wherein the input manipulation can be simplified and thus the transaction time is shortened.

2. Description of the Related Art

Automatic machines by which transactions are automatically executed with the use of a transaction medium such as a card or a passbook are widely utilized in banking field.

It is desirable to simplify the input manipulation from the stand point of convenience for the user. However, the input data obtained from the user manipulation is very important since transaction permission/rejection is determined from the data.

FIG. 14 is a flow chart of a prior art sequence of a transaction function executed by an automatic machine. The sequence is begun by the insertion of transaction medium by the user and is ended when the transaction medium is returned to the user.

First, the transaction medium is inserted into the machine and a magnetic stripe provided on the medium is read by the machine to check the data. Various data, such as a branch code, an account number, a validity code, and an identification number are recorded on the magnetic stripe, and therefore, the validity of the transaction medium and the account number can be checked by reading that data.

When the validity is confirmed by the check, the user then inputs an identification number, which is compared with the number recorded on the transaction medium. When the check is positive, the machine determines that there are no obstacles to starting a transaction.

Subsequently, the user inputs a desired transaction amount, which is the final step in the input operation process.

The machine then communicates with a host computer in accordance with the input data, and the host computer identifies the account number, renews the data, determines the permission/rejection of the transaction, and then transmits direction signals. If a transaction permission signal is received, the machine carries out the transaction by, e.g., counting and discharging bills. Then the transaction data is printed in a receipt or the passbook, and subsequently, the transaction medium is discharged from the machine to end the transaction.

In the above mentioned conventional automatic transactions, the user is required at least to insert the transaction medium and input the secret number and transaction amount, which makes the transaction manipulation inconvenient, thus making the transaction time long.

SUMMARY OF THE INVENTION

An object of the prssent invention is to provide an input an automatic transaction machine wherein the input manipulation is simplified to shorten the transaction time.

In accordance with the present invention, there is provided an an automatic transaction machine comprising reading means for reading data recorded in a transaction medium of an user, operation guidance means for guiding an operation for said user, input means for inputting necessary data by the user according to the operation guidance means and a controller which selectively executes operation of the machine in a first input processing mode and in a second input processing mode in accordance with the read data, wherein in said first mode, said controller controls said operation guidance means so that a transaction amount is input through said input means directly after a validity check of the read data without inputting a secret number, and in said second mode, said controller controls said operation guidance means so that the transaction amount is input after inputting the secret number through said input means after the validity check.

DETAILED DESCRIPTION OF THE PREFERRED EMBODIMENTS

Figure 1:
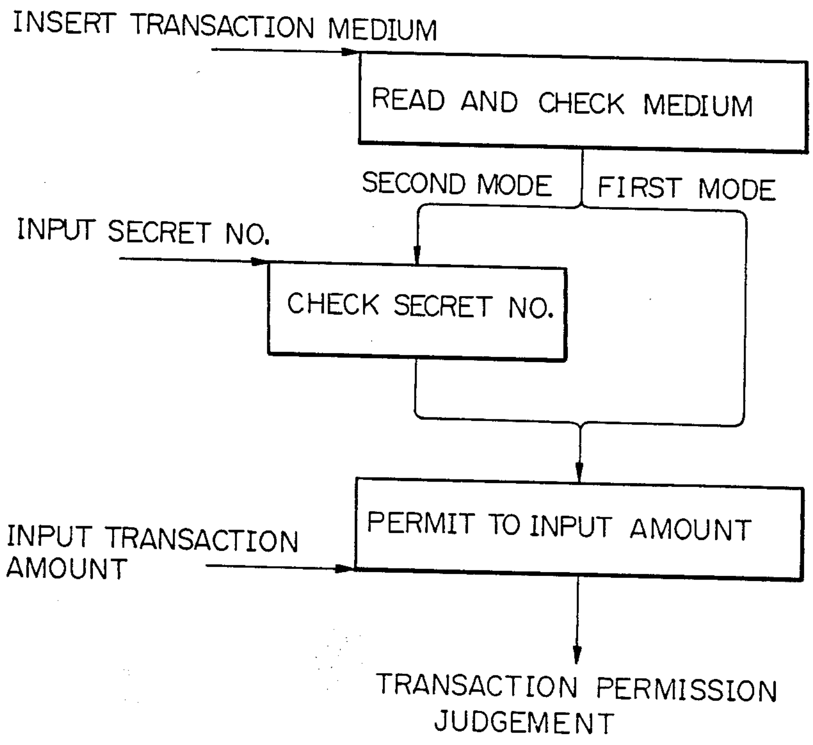
FIG. 1 is an explanatory view of the principle of the present invention.
Figure 2A:
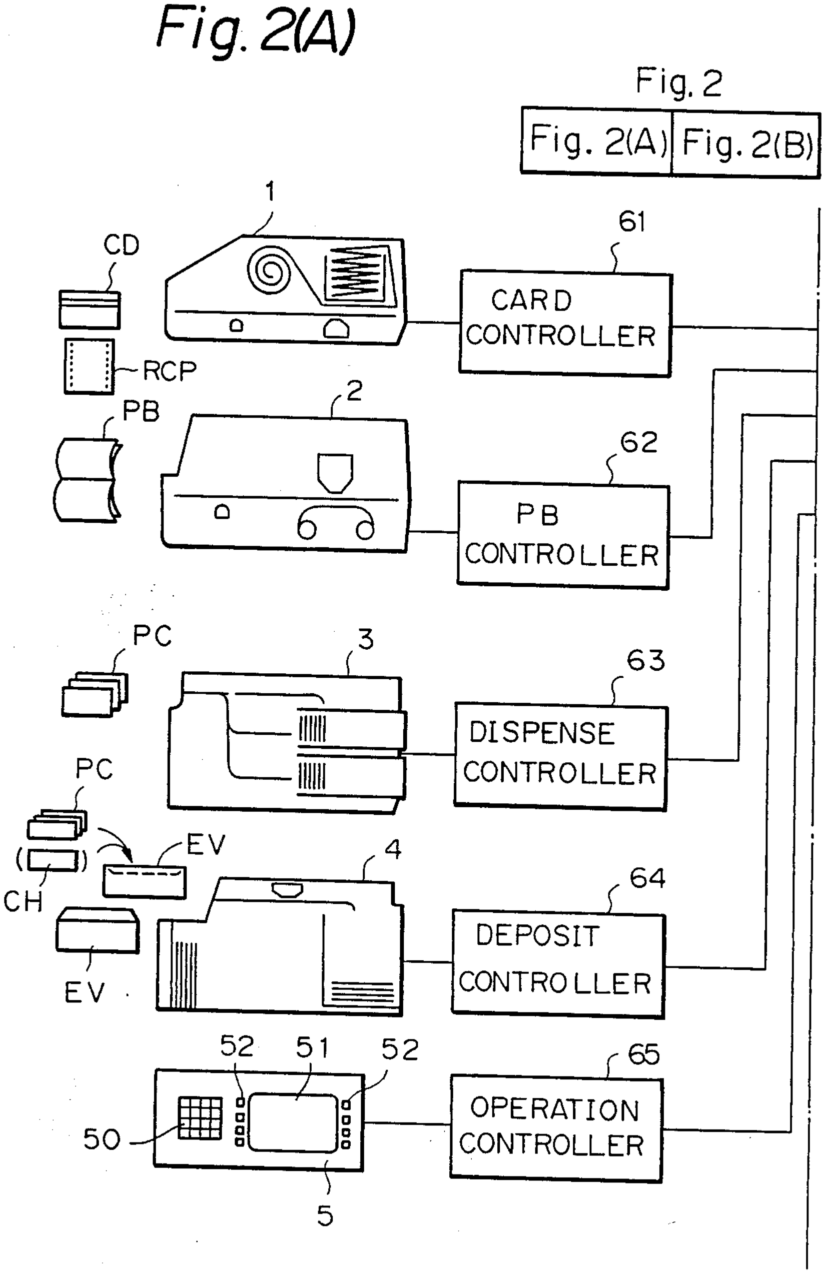
FIG. 2 is a constructional view of an embodiment of the present invention.
Figure 2B:
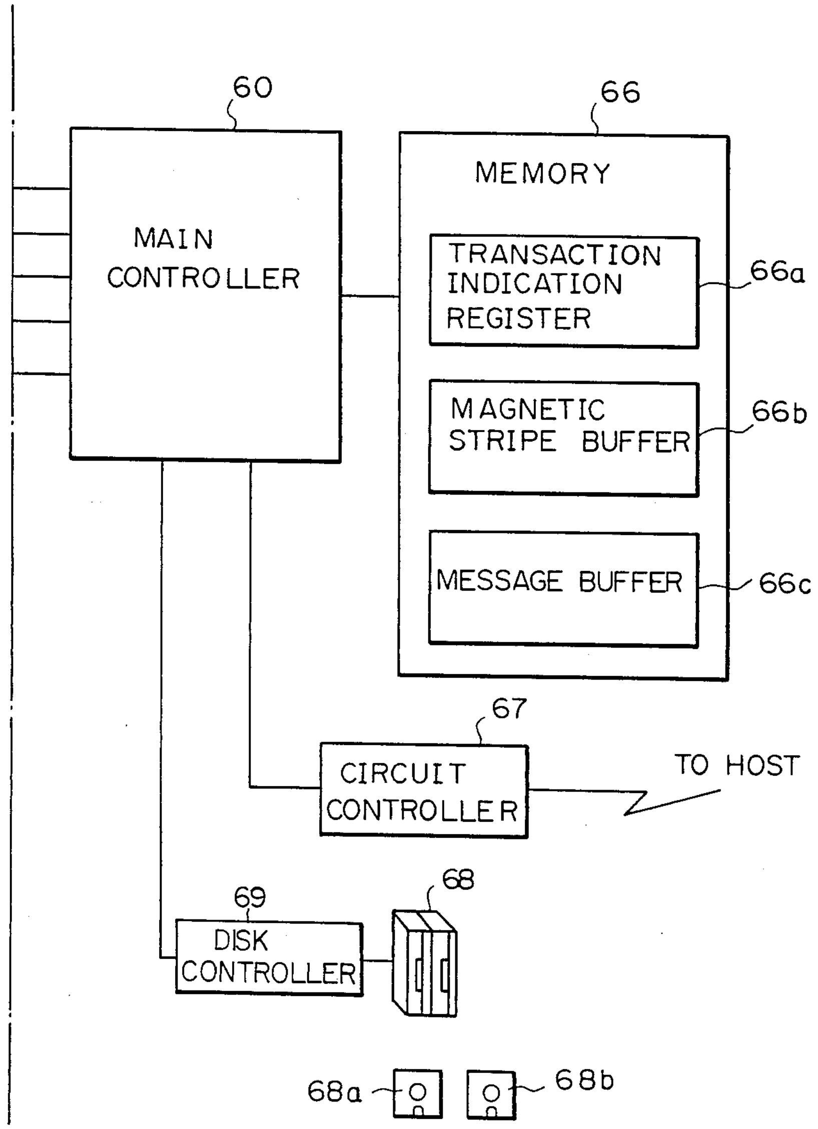

A principle of the present invention is explained hereinafter with reference to FIG. 1. In accordance with the present invention, the input process after insertion of the transaction medium comprises a first mode and a second mode. A controller selects the first mode or the second mode.

In the first mode, a transaction amount is input directly after a validity check of the transaction data, without inputting a secret number for identifying the user. Whereas, in the second mode, a transaction amount is input after inputting the secret number after the validity check.

The transaction mode is selected in accordance with the data (e.g. a grade of a customer) recorded in the transaction medium.

In the first transaction mode of the present invention, input manipulation by the user is simplified, thus reducing the transaction time, since the transaction is executed without inputting the secret number for identifying the user.

The user who is eligible to utilize this first transaction mode is the customer of high grade or having large amount of deposit. The eligibility for utilizing the first transaction mode is recorded in the transaction medium.

Adverse affection to the security of the account is minimized, since the authorized user of this first mode is supposed to carefully keep the transaction medium (card or passbook), since the user is informed of that withdrawal is possible without identifying the user.

For the person who utilizes the second transaction mode, the security of the account is guaranteed since the withdrawal is only possible after identifying the user.

Figures 1, 4A:
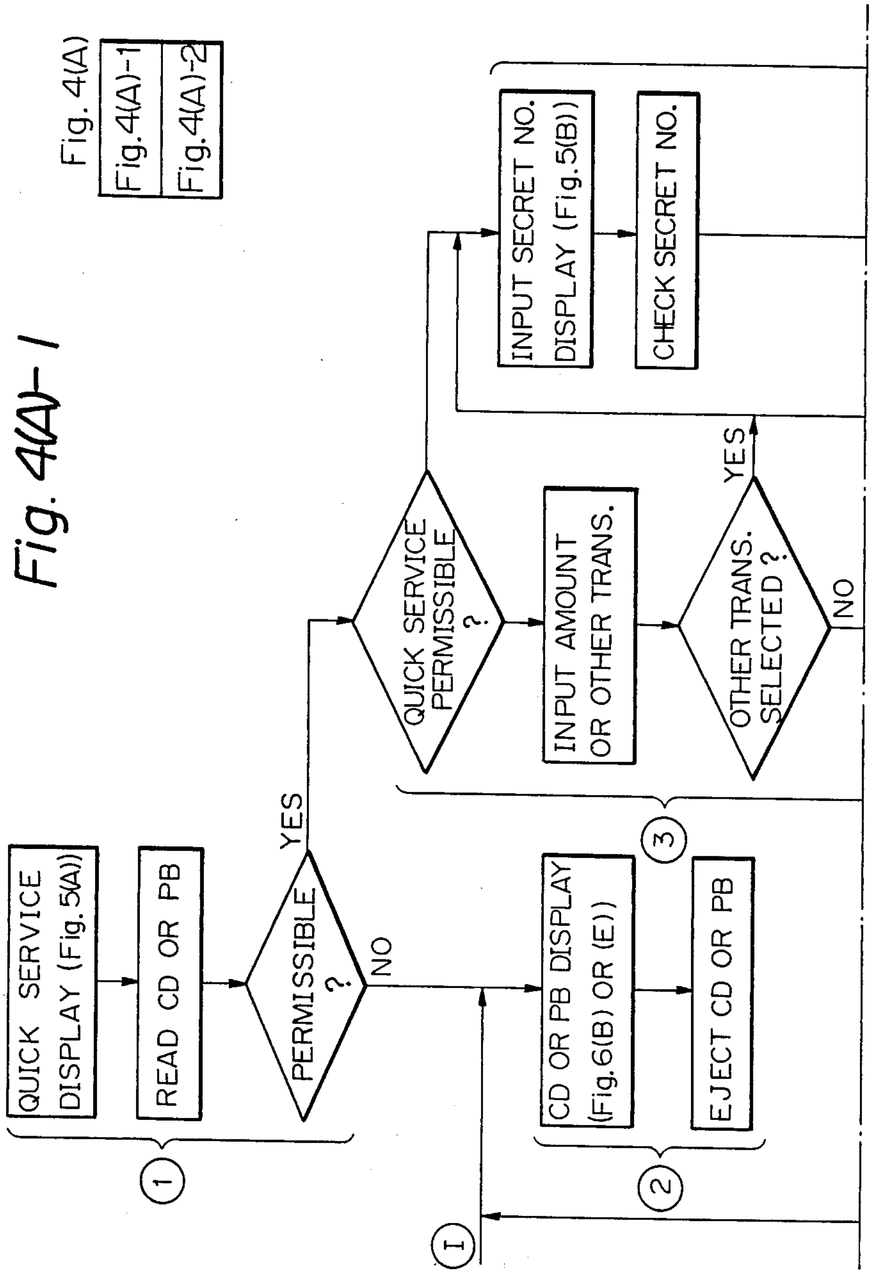
FIGS. 4(A) and 4(B) are flow charts of a transaction process according to the present invention.
Figures 2, 4A:
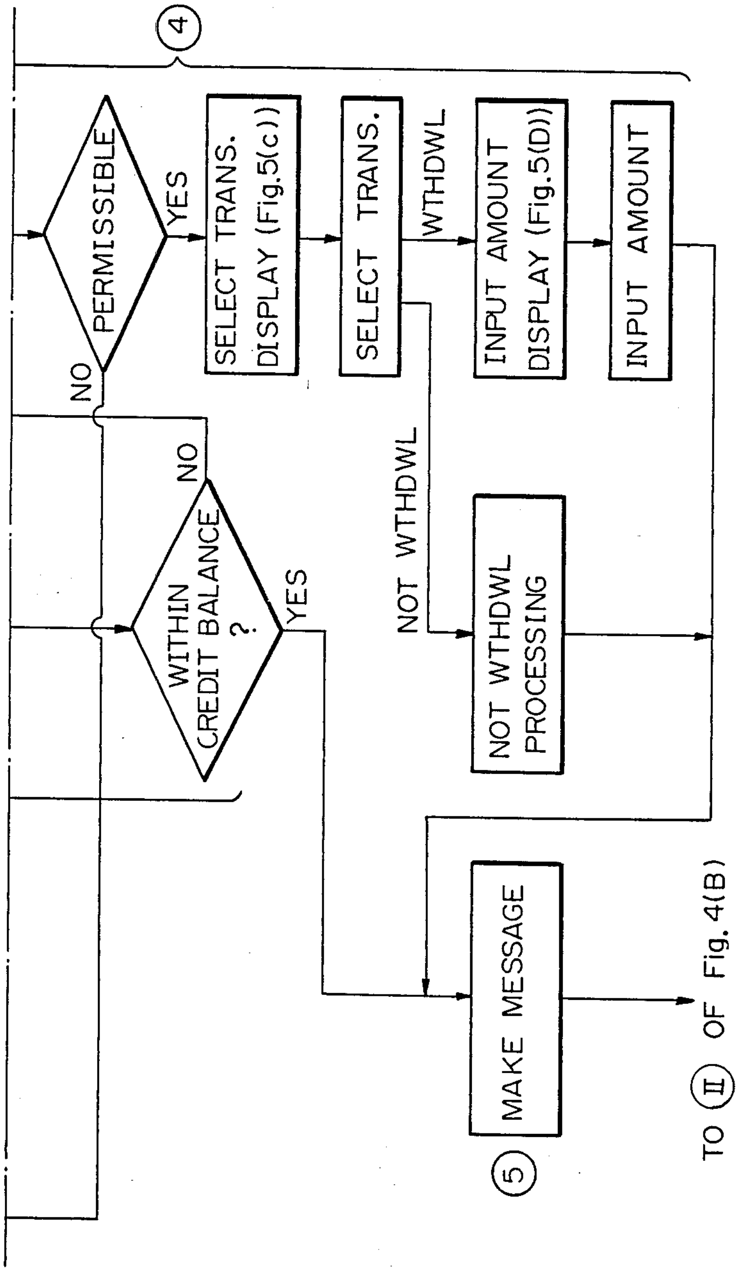

An embodiment of a deposit and withdrawal automatic machine used in the present invention is illustrated in FIG. 2. Numeral 1 designates a card reader - imprinter - printer (CIP). A card CD having a magnetic stripe thereon is inserted into the CIP 1 which reads data written on the magnetic stripe of the card CD, imprints the embossed number on a receipt, and prints the transaction data on the receipt, which is then dispensed to the user together with the card CD. Numeral 2 designates a passbook printer. A passbook PB having a magnetic stripe thereon is inserted into the printer 2, which reads data written on the magnetic stripe of the passbook PB and prints the transaction data in the passbook PB, which is then dispensed to the user. Numeral 3 designates a cash counter for counting paper currency PC from a bill container and dispensing bills in accordance with the transaction order. Numeral 4 designates an envelope depository which first ejects an envelope and then ingests it after the user has enclosed paper currency PC or a check CH therein. An operation panel 5 comprises first input-keys 52 for guiding the operation of the machine by the user, and disposed on both sides of a display 51 and second input keys 50 for data input by the user.

Numeral 60 designates a main controller comprising a micro-computer which controls the functions of the machine in accordance with a program. Numeral 61 designates a card controller which controls the functions of the CIP 1 in accordance with a control signal from the main controller 60. The main controller 60 also controls a passbook controller 62 for operating the passbook printer 2, a dispense controller 63 for operating the envelope depository 4, and an operation controller 65 connected to the operation panel 5. Numeral 66 designates a memory for memorizing program data required for operating the main controller 60. The memory 66 comprises a transaction indication register **66*a*, a magnetic strip buffer 66*b*, and a communication buffer 66*c*. Numeral 67 designates a circuit controller through which the communication with a host computer is conducted in accordance with the commands from the main controller 60. Numeral 68 designates floppy disc drive which constitutes an external memory device in which floppy disc 68*a* and 68*b* are set. The floppy disc 68*a* stores, for example, forbidden account numbers and bank table off-line transaction data. The floppy disc 68*b* stores, for example, programs for operation of the machine. Numeral 69 designates a floppy disc controller which controls the floppy disc drive 68 for read and write operations forward to the floppy discs 68*a* and 68*b* in accordance with commands from the main controller 60**.

Accordingly, this automatic transaction machine has a medium treatment section comprising the CIP 1 and the passbook printer 2, a dispensing section comprising the cash counter 3, a deposit section comprising the envelope depository 4, and an operation section comprising the operation panel 5. The automatic transaction machine constitutes a multi-function machine for the deposit, withdrawal and transferring of money with the use of a card or passbook.

FIG. 3 is an explanatory view of a transaction medium used in the present invention.

Figure 3A:
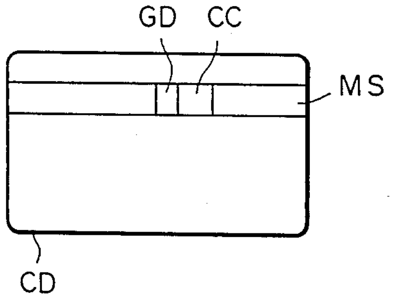
FIG. 3 is an explanatory view of a transaction medium used in the present invention.

The card CD has a magnetic stripe MS thereon, as illustrated in FIG. 3(A). Transaction data, such as the grade of the customer (GD) and credit balance (withdrawal amount from the credit amount during a predetermined term) (CC) are recorded on the magnetic stripe MS.

Figure 3B:
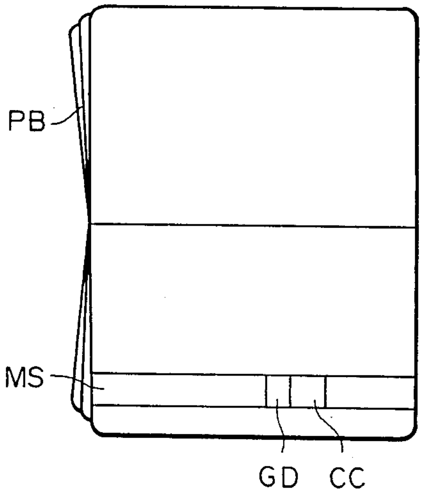

The passbook PB has a similar magnetic stripe MS on the backcover thereof, as illustrated in FIG. 3(B).

The grade of the customer GD is qualification data, and selection of the first transaction mode, including the brief printing mode, is permissible only for a user having a predetermined grade GD.

The credit balance CC restricts the withdrawal amount through the first transaction mode to minimize losses if the transaction medium (card or passbook) is lost or stolen.

Figures 2, 4B:
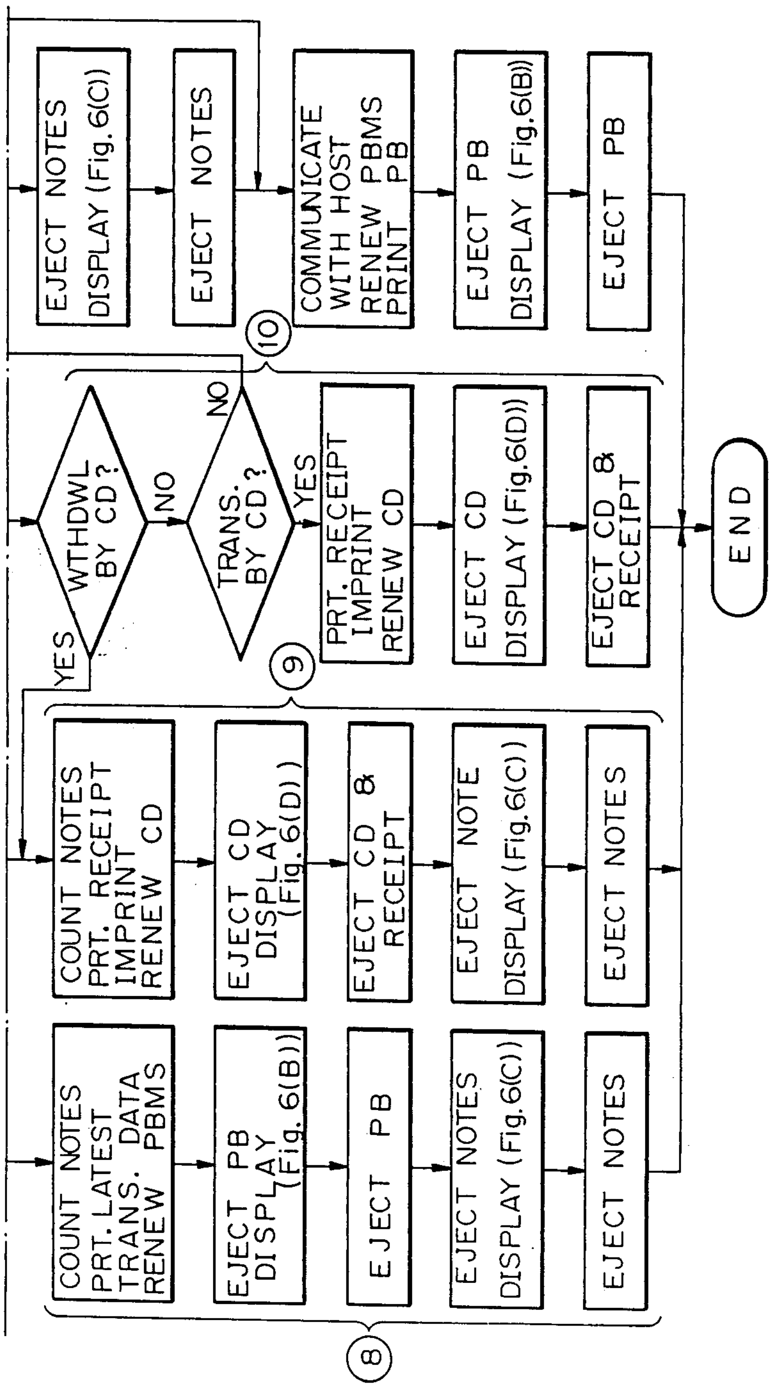

A flow chart of an embodiment of the present invention is shown spanning FIGS. 4(A) and 4(B). The various displays for guiding the operation in FIGS. 4(A) and 4(B) are illustrated in FIGS. 5 and 6. The different printing modes are illustrated in FIGS. 7 and 8.

In this embodiment, two transaction modes are selectable in a withdrawal transaction, which is the most frequently used transaction in the automatic machine. One is a first transaction mode which executes a quick service transaction, and the other is a second transaction mode which executes an ordinary transaction. Transactions other than withdrawals, such as deposit and balance inquiry, are executed only in the ordinary transaction mode (second transaction mode).

Figure 5A:
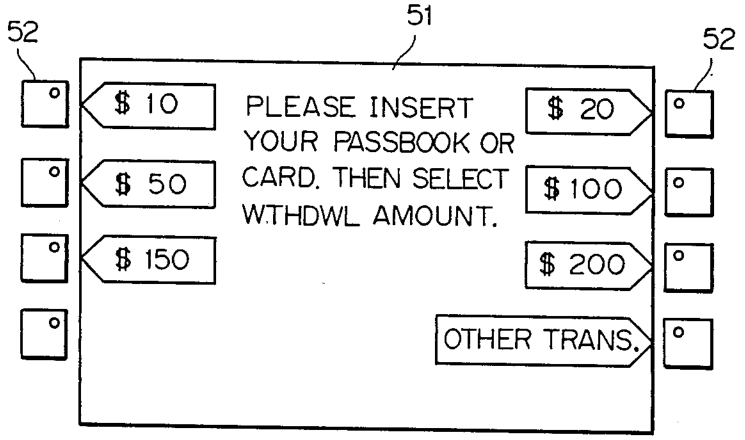
FIGS. 5 and 6 are explanatory views of the display by the automatic machine used in the present invention.

① In the waiting state before a card insertion, a display of the quick service operation as illustrated in FIG. 5(A) is shown on the display 51 of the operation panel 5. This quick service display gives operation guidance lines, such as "insert card or passbook" and "press desired transaction service button". Each of the transaction buttons (input-keys) 52 disposed on both sides of the display 51 corresponds to one of the displays of fixed amount of withdrawal, e.g., from $10 to $200, or displays "other transactions".

In this state, a card CD or a passbook PB is inserted to the CIP 1 or PB printer 2, which then reads transaction data written on the magnetic stripe MS. The read data is transmitted to the main controller 60 through the card controller 61 or the PB controller 62 and stored in the magnetic strip buffer **66*b* in the memory 66**.

The main controller 60 checks the validity of the transaction medium in accordance with the data stored in the magnetic stripe buffer **66*b***, by checking the branch code, validity code, and account number.

Figure 6A:
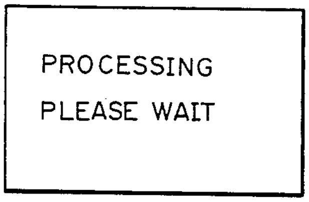
Figure 6B:
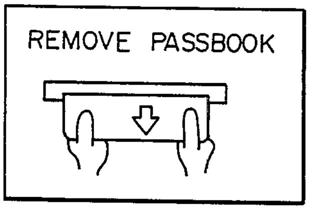
Figure 6C:
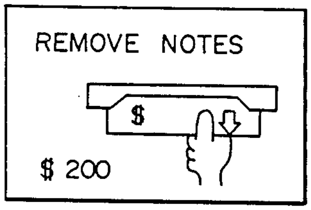
Figure 6D:
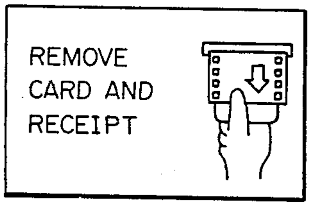
Figure 6E:
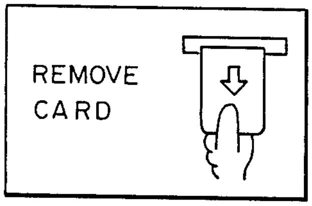

② If the validity check shows that the transaction is not permissible, the operation panel 5 shows a card ejection display or a passbook ejection display through the operation controller 65, as illustrated in FIGS. 6(B) or 6(E), and the card or passbook is then returned to the user.

③ On the other hand, if the validity check shows that the transaction is permissible, then the main controller 60 checks the grade of the customer from the data in the buffer **66*b***, to determine whether or not a quick service transaction is permissible.

If the quick service transaction is permissible, a quick service withdrawal is registered in the transaction register **66*a* of the memory 66, in order to receive an input from a selected key button 52 in FIG. 5(A). When the user pushes one of the keys 52, the selected transaction input is transmitted to the main controller 60 through the operation controller 65**.

If "other transactions" is selected, the main controller 60 cancels the quick service withdrawal registered in the transaction register *66a* and changes (rewrites) it to an ordinary transaction represented in step ④ of the flow chart of FIG. 4(A).

On the other hand, if the user selects one of the fixed amount withdrawal buttons (FIG. 5(A)), the main controller 60 compares the input amount with the credit balance CC memorized in the buffer *66b* of the memory 66. If the input amount is more than the credit amount, the main controller 60 cancels the quick service transaction and changes a quick service withdrawal registered in the transaction register *66a* to the ordinary withdrawal transaction of step ④ the flow chart.

As can be seen from the above explanation, the quick service transaction is limited to the fixed amount withdrawal shown in the display of FIG. 5(A). Withdrawal transactions for amounts other than the displayed amount, or other transactions such as deposit or balance inquiry, are executed in the ordinary transaction mode.

④ If the quick-service transaction is not permissible in step ③, the main controller 60 registers the ordinary transact in the transaction register *66a* of the memory 66.

Figure 5B:
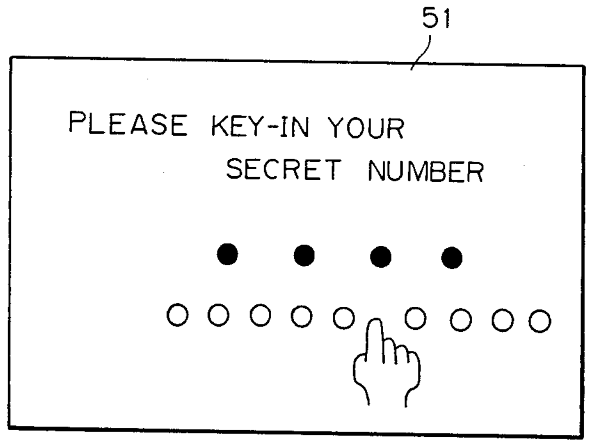

Subsequently, "input secret number" is displayed in the display 51 of the operation panel 5, as illustrated in FIG. 5(B). This display of FIG. 5(B) is also shown when the quick service transaction is cancelled in step ③, as mentioned above.

The secret number for identifying the user is input by the user by pushing second keys 50 (FIG. 2), and the input number is transmitted to the main controller 60 through the operation controller 65. The main controller 60 compares the input secret number with the identification number memorized in the magnetic stripe buffer *66b* of the memory 66.

If the input number does not coincide with the registered number, the process goes back to step ②, and the card or the passbook is returned to the user.

Figure 5C:
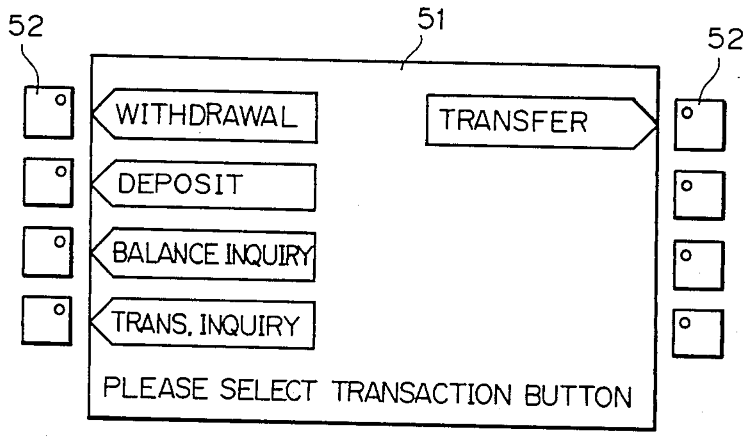

On the other hand, if the input secret number coincides with the registered number, "select service" is displayed in the display 51 of the operation panel 5, as illustrated in FIG. 5(C). The user pushes a desired input key 52 selected from among the "withdrawal", "deposit", "balance inquiry", "transaction inquiry", and "transfer funds" keys.

Figure 5D:
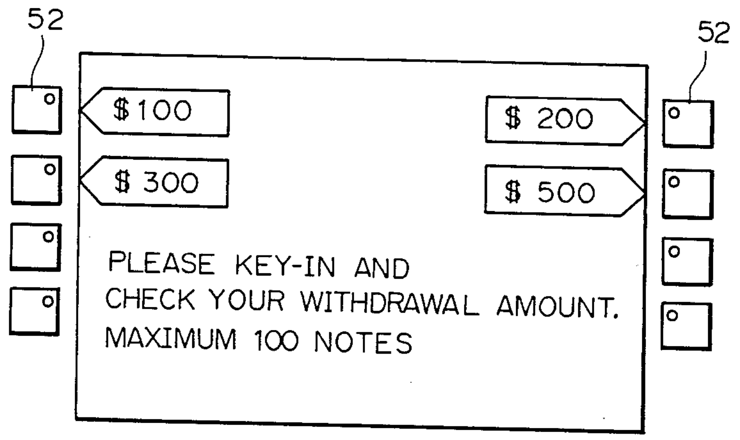

If the user selects the withdrawal transaction, the main controller 60 registers the ordinary withdrawal transaction in the register *66a* and displays a withdrawal amount selection display, as illustrated in FIG. 5(D), on the display 51 of the operation panel 5. The display of FIG. 5(D) shows a fixed amount of either $100, $200, $300, or $500, which can be input by pushing one of the first input-keys 52. A withdrawal amount other than the displayed fixed amount is input by pushing the second input-keys 50 (FIG. 2).

If a transaction other than "withdrawal" is selected in the display of FIG. 5(C), the main controller 60 registers the selected transaction in the register *66a* and executes the selected transaction. For example, if "balance inquiry" or "transaction inquiry" is selected, the process goes to step ⑤ without further data input. If "deposit" is selected, the envelope depository 4 is driven. If "transfer funds" is selected, the transfer amount and account number must be input.

Accordingly, the input process ends at step ③ or ④.

Figure 7A:
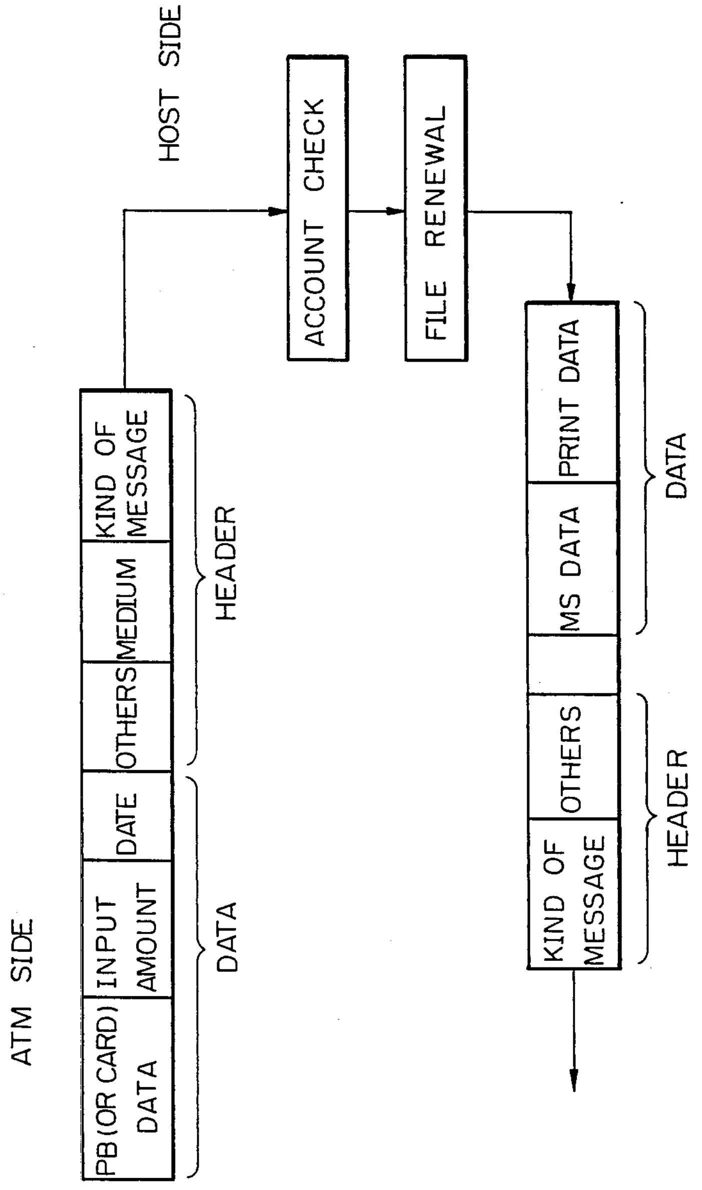
FIG. 7 is an explanatory view of a passbook printing mode in a quick service operation.

⑤ The main controller 60 sends a communication message to the host computer in accordance with the data recorded in the transaction indication register *66a*. If the quick service transaction is registered, the communication message comprises a header portion (kind of message (quick trans.), kind of medium) and a data portion (data, input amount, PB (or card) data), as illustrated in FIG. 7(A). If the ordinary transaction is registered, the communication message comprises a header portion (kind of message (ordinary trans.), kind of medium) and a data portion (data, input amount, input secret number, PB (card) data), as illustrated in FIG. 8(A).

⑥ The main controller 60 transmits the communication message to the host computer through the circuit controller 67, and the display 51 of the operation panel 5 displays "Processing Please Wait", as illustrated in FIG. 6(A).

Figure 8A:
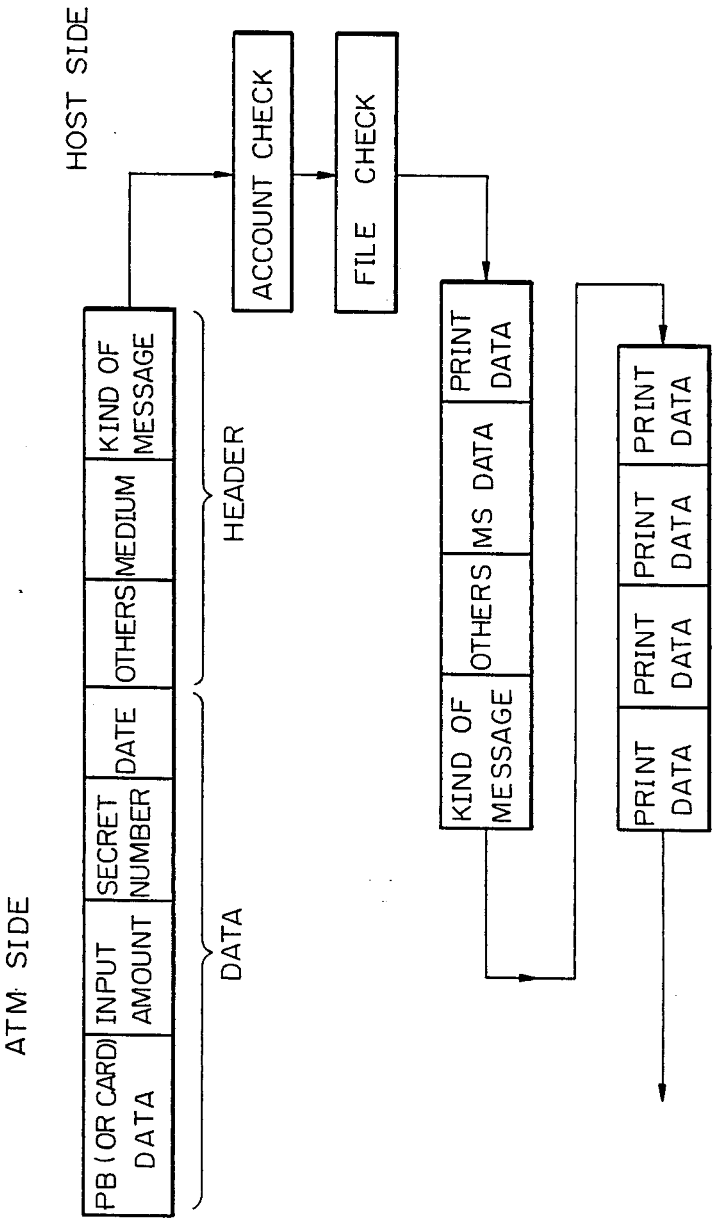
FIG. 8 is an explanatory view of a passbook printing mode in an ordinary device operation.

When receiving the message shown in FIG. 7(A) or 8(A), the host computer checks the user's account recorded in the account file and decides whether or not to permit the transaction. The host computer then renews the user's file. Subsequently, the host computer transmits a transaction permission/rejection message to the main controller through the circuit controller 67. The main controller 60 stores the message in the communication buffer *66c*, and then analyzes the message.

If a transaction rejection message is included in the header portion of the message to the main controller 60, the process returns to step ② of FIG. 4(A) and the card or passbook is ejected.

⑦ If a transaction permission message is transmitted to the main controller 60, the main controller 60 determines the kind of transaction from the data recorded in the transaction register *66a*, and if a process other than the quick service transaction is desired, the flow goes to step ⑨.

⑧ In the quick service transaction using a passbook, the main controller 60 drives the cash counter 3 to count the required amount of bills through the dispense controller 63, in accordance with the message from the host computer and the input withdrawal amount recorded in step ③.

At the same time, the magnetic stripe data and the printing data are transmitted to the passbook controller 62 which drives the passbook printer 2 to renew the data of the magnetic stripe and print the data in the passbook.

The printing data transmitted from the host computer includes only the latest data of the transaction now under execution. Therefore, the brief printing mode wherein only the latest transaction data is printed is executed in the quick service transaction. Namely, even if there is data recorded in the file of the host computer, and data is not printed in the passbook, the not-printed data of the former transactions is not transmitted to the main controller. Therefore, the printing time is shortened in the quick service transaction. In this printing process, the balance is not printed to avoid confusing the user, since the former transaction data is not printed on the passbook.

The display 51 then displays "remove passbook", as illustrated in FIG. 6(B) and the passbook is ejected from the PB printer 2.

The display 51 then displays "remove notes", as illustrated in FIG. 6(C), the required amount of notes is ejected from the cash counter 3, and thus the transaction is completed.

⑨ In the withdrawal transaction using a card instead the passbook in step ⑦, the main controller 60 transmits required withdrawal amount input in step ③ to the dispense controller 63 and drives the cash counter 3 to count the required amount of cash.

At the same time, the main controller 60 drives the CIP 1 through the card controller 61 to imprint the embossing of the card on the receipt and print the data on the receipt and renew the magnetic stripe MS.

The display 51 then displays "remove card", as illustrated in FIG. 6(D), and the card and the receipt are ejected from the CIP 1.

Then the display 51 displays "remove notes", as illustrated in FIG. 6(C), and the required amount of notes is ejected from the cash counter 3, and thus the transaction is completed.

⑩ In an ordinary transaction other than the quick service transaction in step ⑦, the main controller 60 determines the kind of and medium from the data recorded in the transaction register 66*a*. In the case of a card withdrawal transaction, the process is executed in accordance with step ⑨, and in tne case or a passbook transaction, the process goes to step ⑪.

In the case of a card transaction other than a card withdrawal transaction, the main controller 60 drives the CIP 1 through the card controller 61 to imprint the embossing the card or the receipt and print the data on the receipt and renew the data recorded in the magnetic stripe MS.

The display 51 then displays "remove card and receipt", as illustrated in FIG. 6(D), and the card and the receipt are ejected from the CIP 1, and thus the transaction process is ended.

⑪ In the case of a transaction other than the card transaction in step ⑩, the process is executed according to whether or not the transaction is a withdrawal.

In the case of a withdrawal transaction using a passbook, the main controller 60 drives the cash counter 3 through the dispense controller 63 to count the required amount of cash, and at the same time, the main controller 60 drives the passbook printer 2 through the passbook controller 62 to renew the data of the magnetic stripe of the passbook.

The display 51 then displays "remove notes", as illustrated in FIG. 6(C), and the required amount of notes is ejected from the cash counter 3. The process then goes to the passbook printing step.

Figure 8B:
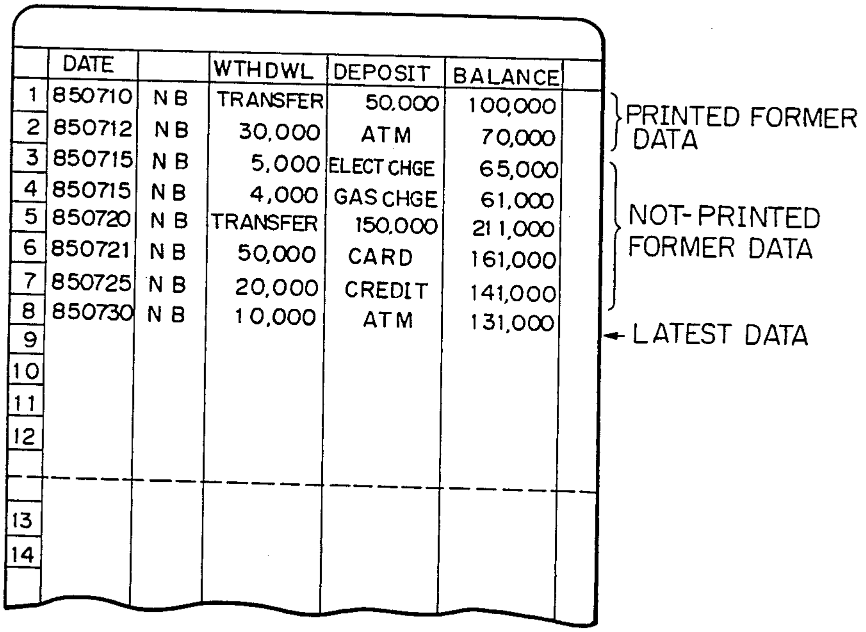

In the printing step of the transaction other than the quick service transaction using the passbook, the former transaction data recorded in the file of the computer, but not printed in the passbook, is printed in the passbook together with the data of the latest transaction now under execution, as illustrated in FIG. 8(B).

The display 51 then displays "remove passbook", as illustrated in FIG. 6(B), and the passbook is ejected from the passbook printer 2, and thus the process is ended.

As mentioned above, in the quick service transaction, only a fixed withdrawal amount transaction is possible, so that the input operation is simply done by pushing one of the input-keys 52 of FIG. 5(A). Also, in the quick service transaction, only the data of the latest transaction is printed in the passbook. Therefore, the input manipulation becomes very easy and the printing time is shortened, which reduces the overall transaction time.

On the other hand, in the ordinary transaction, any desired withdrawal amount and transactions other than a withdrawal are made possible by inputting a secret number and the transaction amount in the conventional way. Also, all of the not-printed data of former transactions is printed in the passbook in the same manner as in the conventional printing mode.

When the quick service transaction is permissible, the user can select the other transactions in step ③ instead of using the quick service transaction mode, whereby the user can indicate any desired withdrawal amount and print the former not-printed data in the passbook in accordance with the ordinary printing mode.

Further, in the case of the quick service transaction, the service mode is automatically changed to the ordinary transaction if the withdrawal amount is more than the users credit balance, which guarantees the transaction security since the user must be identified by a secret number.

The credit balance is the maximum withdrawal amount by the quick service operation in one day or during a predetermined number of days, and is renewed after every quick service transaction.

The above mentioned embodiment comprises a multifunction automatic machine which executes various transactions such as withdrawal, deposit, transfer, etc. However, the present invention can be applied to a single function automatic machine which executes only withdrawal transaction. The present invention can be also applied to an automatic machine which executes transactions using either card or passbook.

The transaction data may be printed in the passbook in the ordinary printing mode instead of the brief printing mode, in the quick service transaction. Also, it is possible to arrange so that a desired withdrawal amount can be input instead of the fixed amounts in the quick service transaction as in the above mentioned embodiment. Also, the secret number may be checked by the host computer instead of checking it by the terminal equipment.

The present invention can be modified in various way within the scope of claim for the invention.

As mentioned above, in accordance with the present invention, the transaction can be executed without inputting the secret number by using the transaction medium for the authorized person in the first input processing mode, whereby the input manipulation by the user is simplified and the transaction time is shortened, which promotes the transactions by using the automatic machine.

Figure 9:
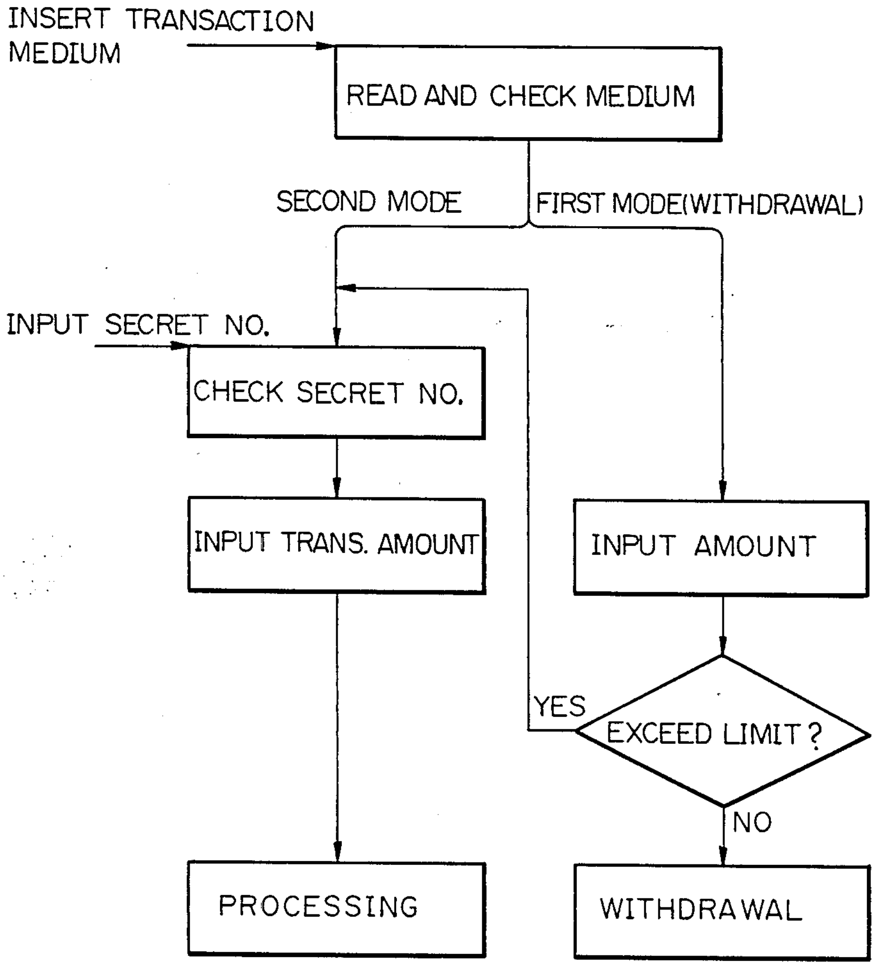
FIGS. 9 to 11 are explanatory views of different embodiments of the present invention.

FIG. 9 is an explanatory view of another embodiment of the present invention. In this embodiment, there are two transaction modes, i.e. a first transaction mode wherein withdrawal is possible without inputting secret number of the user and a second transaction mode wherein inputting secret number is necessary to withdraw money. The transaction mode is automatically selected by a controller in accordance with transaction data (e.g. data of a grade of a customer) recorded in the transaction medium. The first mode can be utilized only by authorized person. Whereas the second mode can be utilized by ordinary person. The embodiment is characterized in that, during the procecution of the first mode transaction, if the input withdrawal amount exceeds a predetermined limit, the transaction mode is automatically changed to the ordinary second mode wherein the user is requested to input the identification secret number.

In the first transaction mode of the embodiment, the authorized user can withdraw money from the account without inputting the secret number, which makes the input process simplified and transaction time reduced.

However, transaction permission in the first mode is determined only from the read data recorded in the transaction medium without identifying the user, which causes a problem that if the transaction medium is lost or stolen, the medium is abused by a third person. In this embodiment, a withdrawal limit is settled in the first mode transaction. If the withdrawal amount input by the user exceeds the limit, the transaction mode is changed to the second mode wherein the user is required to input the secret number for identification, thus guaranteeing the security of the simplified withdrawal transaction.

By settling the upper limit of withdrawal amount, it is possible to minimize the damage when the transaction medium is stolen or lost. The authorized user can withdraw more than the limited amount by changing the transaction mode to the second mode inputting the secret number.

Figure 10:
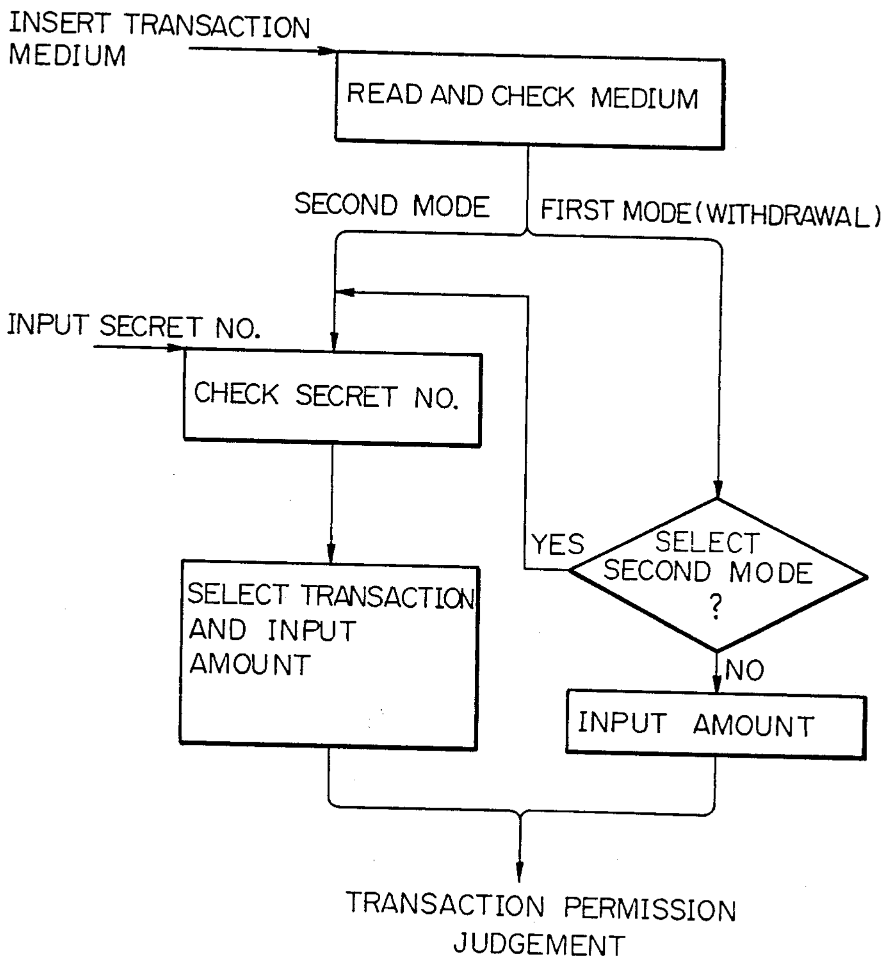

FIG. 10 is an explanatory view of further embodiment of the present invention. In this embodiment, there are two transaction modes, i.e. a first transaction mode and a second transaction mode. A controller automatically selects the transaction mode in accordance with the data (such as a grade of a customer) recorded in the user's transaction medium. When the controller selects the first mode by reading the data of the medium, the user can change the mode to the second mode by manually inputting the command to change the mode. By this arrangement, various kind of transactions other than withdrawal can be utilized by the use of the transaction medium of the person authorized to utilize the first transaction mode.

Figure 11:
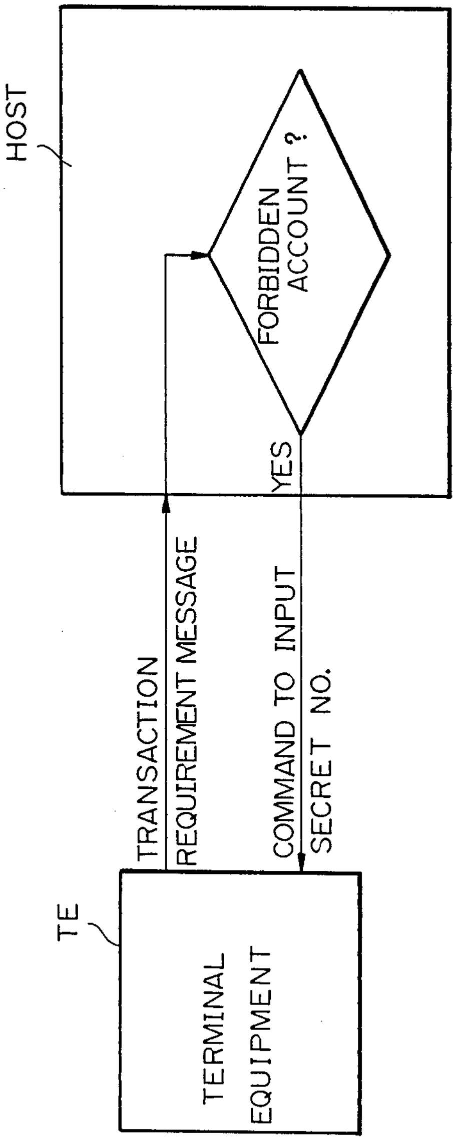
Figure 12:
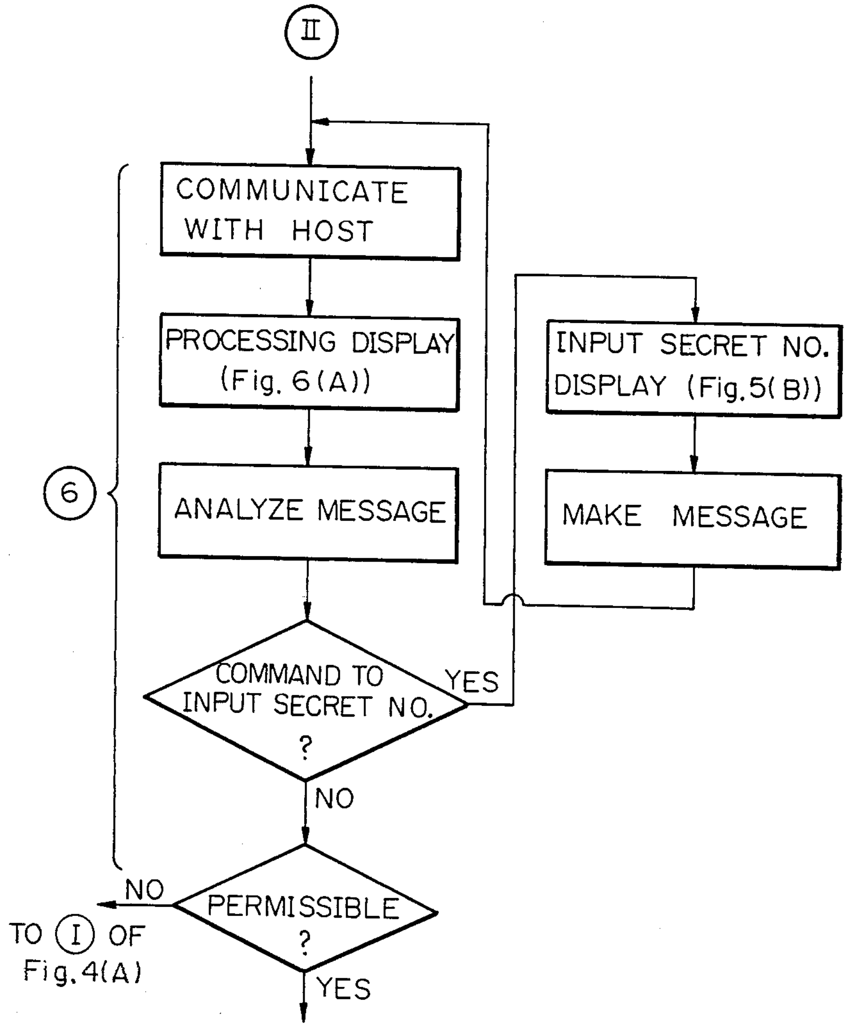
FIG. 12 is a flow chart of the transaction process of the embodiment of FIG. 11.

FIG. 11 is an explanatory view of still another embodiment of the present invention. The reference TE designates a terminal equipment, such as a POS terminal device of an automatic transaction machine, having means for reading the transaction medium and means for inputting the secret number. A host computer HOST has a file of user's accounts and checks the file in accordance with a transaction requirement message from the terminal equipment to determine transaction permission/rejection. If the account is a suspicious one, the host computer transmits a secret number input command message to the terminal equipment.

The host computer HOST receives the transaction requirement message without secret number and check the corresponding account in the file. If the account is suspicious, i.e. for example the account is reported to be stolen or lost or the number of withdrawal transaction or withdrawal sum in the day exceeds a predetermined limit, the host computer commands to the terminal equipment to input the secret number.

In this embodiment, transaction is basically carried out without identifying the secret number. Inputting the secret number is required only when the transaction account is a suspicious one. Therefore, if there is no obstacles in the data of the account, it is possible to transact without inputting the secret number, which makes the transaction process simplified. Also, it is possible to avoid abuse of the transaction medium by a person other than the authorized user, by checking the account and commanding to input the secret number if the account is a suspicious one.

The transaction processing flow of this embodiment differs from that of FIG. 4 only in step ⑥ which is a communication step with the host computer. Other steps of the flow is the same as those of FIG. 4.

Figure 13A:
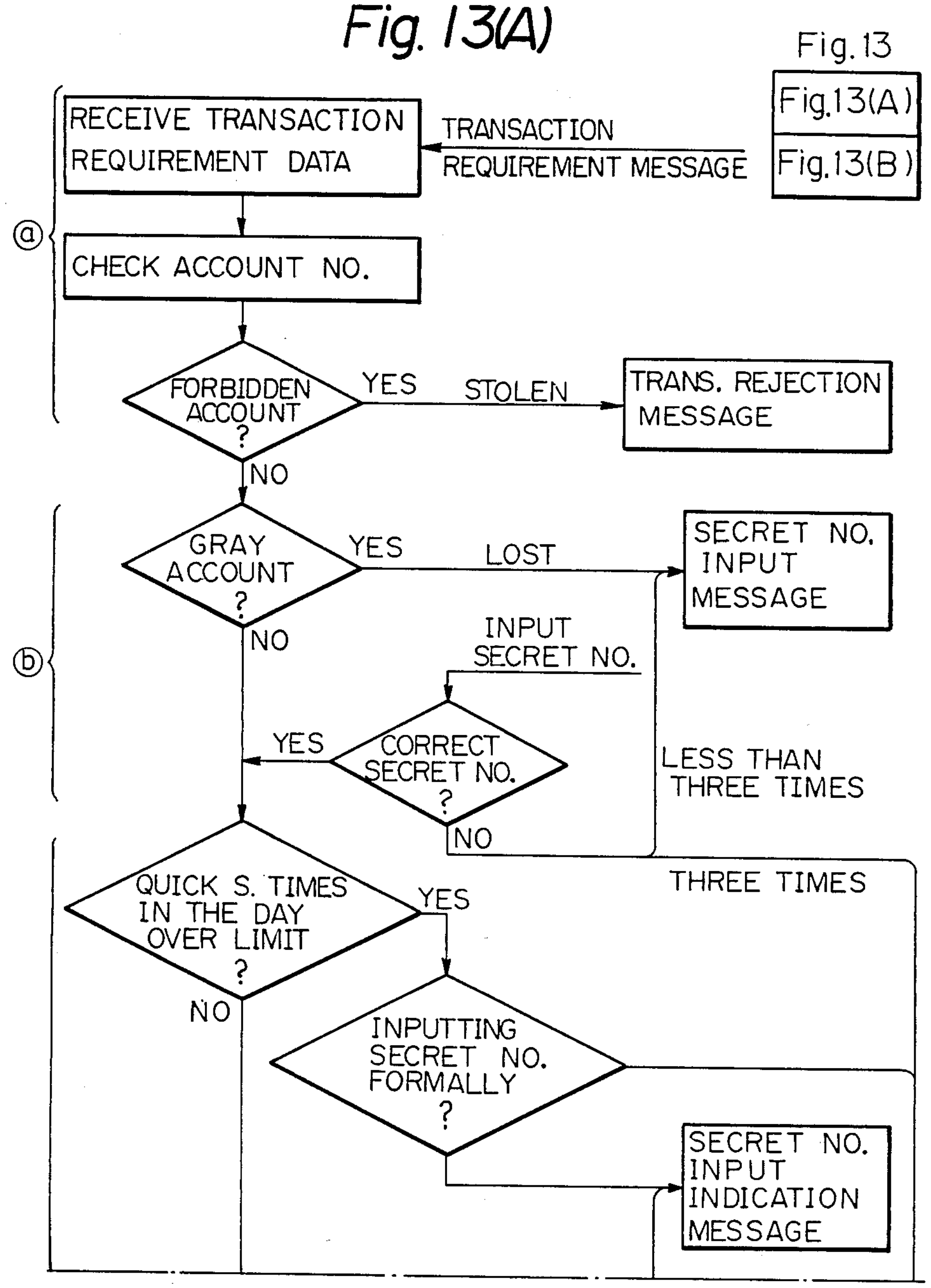
FIG. 13 flow chart of the process in the host computer of the embodiment of FIG. 11.
Figure 13B:
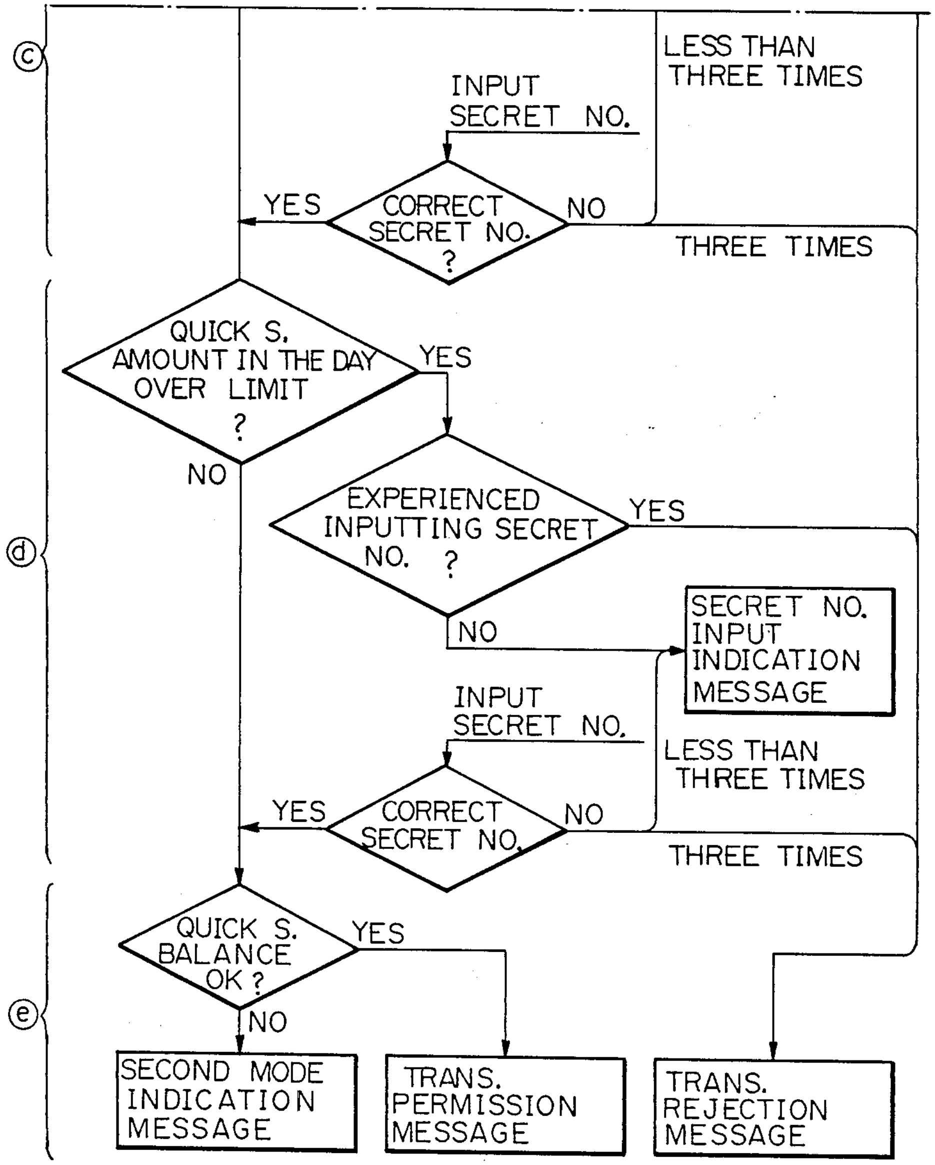
Figure 14:
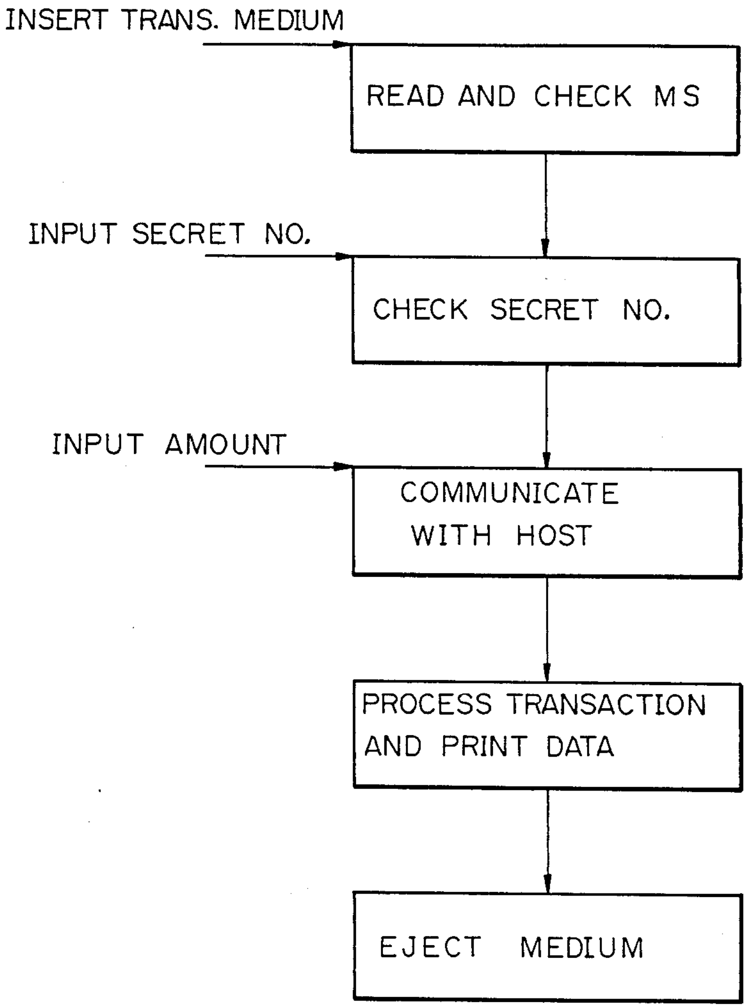
FIG. 14 is an explanatory view of a prior art process.

The flow chart of the communication step with the host computer is represented in FIG. 13.

In the aforementioned checking process of the account, if the quick service transaction is required, the host computer executes the process shown in FIG. 13.

ⓐ The host computer receives a transaction requirement message from the terminal equipment and recognizes the quick service withdrawal requirement. Then, the host computer checks the account in the file.

In the account file are stored, flags such as forbidden accounts reported to be stolen and gray account reported to be lost. Also, data of number of transaction in quick service made and the sum of the withdrawal amount in the same day and the balance for quick service transaction and stored in the file.

The host computer checks the file. If the account is a forbidden one, the host computer transmits a transaction rejection message to the terminal equipment.

ⓑ If the account is not a forbidden one, the host computer further checks if it is a gray account or not. If it is a gray account, the host computer transmits a secret number input indication message.

When a secret number message is transmitted from the terminal equipment, the host computer compares the secret number input by the user with the registered identification number.

If the transmitted secret number does not coincide with the registered number, the host computer commands to input the secret number again. Such an identification operation is repeated three times. If the correct secret number is not transmitted from the terminal equipment at the third time, the host computer transmits a transaction rejection message.

ⓒ If the above mentioned check results are pos then the host computer checks whether the number of the quick service withdrawal operation in the day is within a predetermined limit or not.

If the quick service withdrawal operation was already carried out more than the limited times in the day, then the host computer checks if the user input the secret number in the former quick service transaction in the day. If the user input the secret number in the former transaction, the user is supposed not to be the authorized person and the host computer transmits a transaction rejection message.

On the other hand, if the user did not input the secret number in the former quick service transaction in the day, the same checking process as step ⓑ is executed.

ⓓ If the number of quick service operation in the day is within the limit or the secret number input by the user is correct in the above mentioned step ⓒ, the host computer checks whether or not the sum of the withdrawal amount in the day exceeds a predetermined limit. If it exceeds the limit, the host computer checks if the user input the secret number in the former quick service transaction in the day, in the similar way mentioned in the above step ⓒ, If the user input the secret number in the former qurck service transaction, the host computer transmits a transaction rejection message. On the other hand, if the user did not input the secret number in the former quick service transaction, the host computer transmits a secret number input command message and executes the same process hereinafter as in step ⓑ.

ⓔ If the with sum is within the limit or the user input the correct secret number in the above step ⓓ, the host computer checks whether or not the balance for the quick service transaction is sufficient for the withdrawal amount input by the user. If the balance is insufficient, the host computer transmits a second mode command message to the automatic machine. Thus, the quick service transaction mode is changed to the ordinary transaction mode (second mode) and the transaction is executed in accordance with step ④ of FIG. 4(A). On the other hand, if the balance is sufficient, the host computer renews the data of the number of the quick service withdrawal transactions in the day, the withdrawal sum is the day, the balance for the quick service transaction and the balance of the account, and transmits a transaction permission message.

As mentioned above, in the quick service transaction, the host computer executes various checks and, if one of the checks is not permissible, commands to input the secret number to identify the user. Once the secret number input process is executed, then in the subsequent processes if one of the checks are not permissible, the host computer transmits a transaction rejection message without commanding to input the secret number again.

On the other hand, in the process of the ordinary transaction, the host computer transmits a transaction rejection message if one of the checks is not permissible, or a transaction permission message if all of the checks are permissible.

I claim:

1. An automatic transaction machine comprising:

reading means for reading data recorded on a transaction medium for a user;

validity checking means for checking the validity of the data read by said reading means;

operation guidance means for providing operation guidance information to the user;

input means for inputting data input by the user in response to said operation guidance information; and control means, having first and second input processing modes, for selecting the first input processing mode to control said operation guidance means so that a transaction amount can be immediately input through said input means directly after a validity check of the read data, and for selecting the second input processing mode to control said operation guidance means so that the transaction amount can be input only after inputting a user identification number through said input means after the validity check.

2. An automatic transaction machine according to claim 1, wherein said control means comprises:

means for checking the transaction amount and for changing the automatic transaction machine from the first input processing mode to the second input processing mode when the transaction amount exceeds a predetermined limit.

3. An automatic transaction machine according to claim 1, wherein said control means includes means for changing the operation mode from the first input processing mode to the second input processing mode in response to a second mode command input through said input means.

4. An automatic transaction machine according to claim 3, wherein ssaid control means further comprises:

(a) memory means for storing a first guidance pattern including information for insertion of the transaction medium into said reading means, for selection of withdrawal amount and for selection of another transaction, and a second guidance pattern including information for selection of a transaction from a plurality of transactions;

means for providing the first guidance pattern to said operation guidance means according to the selection of a transaction, and means for performing transactions selected from the second guidance pattern in said second mode.

5. An automatic transaction machine according to claim 1 further including:

host computer means, connected to said control means, for verifying the processing mode of said control means, and for providing a transaction message to said control means in response to said verifying, and wherein said control means includes means for communicating with said host computer control means from the host computer.

6. An automatic transaction machine according to claim 1, wherein said operation guidance means comprises a display means for displaying the guidance information instructing the user to input the transaction medium and for displaying fixed transaction amounts for the user utilizing the first mode transaction, before insertion of the medium.

7. A control system for an automatic transaction machine having an operation mode and having a reading means for receiving a transaction medium and reading data recorded on the transaction medium, an input means operable by a user for inputting data, and a display means for displaying information regarding operation of ssaid input means for the user, said control system comprising:

validity-checking means for checking data read by the reading means from the transaction medium and confirming whether the transaction mediium is valid;

a mode-selection means for determining whether the operation mode of said machine is a quick transaction mode or an ordinary transaction mode in accordance with said data read by the reading means from the transaction medium when the transaction medium is valid;

a first transaction-processing means for selectively inputting one of a withdrawal amount and an ordinary transaction command for selection of an ordinary transaction mode through the input means, without requesting input of an identification number for identifying the user, when the quick transaction mode is selected; and a second transaction-processing means for inputting the ordinary transaction command for selection of the ordinary transaction mode through the input means only after an identification number identifying the user is input through the input means and validated by said validity checking means when the ordinary transaction mode is selected, said second transaction-processing means comprising means for permitting input of a withdrawal amount when the ordinary transaction command is input through said input means.

8. A control system is recited in claim 7, wherein said first transaction-processing means comprises:

first transaction-changing means for changing the operation mode of said automtic transaction machine from the quick transaction mode to the ordinary transaction mode when the ordinary transaction mode command is input through the input means.

9. A control system as recited in claim 7, wherein said first transaction-processing means comprises:

first transaction-changing means for checking the withdrawal amount input through the input means and changing the operation mode of said automatic-transaction machine from the quick transaction move to the ordinary transaction move when the withdrawal amount input through the input means exceeds a predetermined limit.

10. A control system as recited in claim 8, wherein said first transction-processing means further comprises:

a second transaction-changing means for checking the withdrawal amount input through the input means and changing the operation mode of said automatic-transaction machine from the quick transaction mode to the ordinary transaction mode when the withdrawal amount input through said input means exceeds a predetermined limit.

11. A control system for an automatic transaction machine according to claim 7, further comprising:

first information-providing means for providing a first guidance pattern to the user on the display means before the transaction medium is inserted into the reading means and for maintaining, when the quick transaction mode is selected, the first guidance pattern on the display means until the withdrawal amount or the ordinary transaction command is input through the input means, said first guidance pattern including information for insertion of the transaction medium into the reading means, selection of the withdrawal amount and selection of the ordinary transaction mode;

second information-providing means for providing a second guidance pattern to the user on the display means when the ordinary transaction mode is selected and for maintaining said second guidance pattern on the display means until the identification number is input through the input means, said second guidance pattern including information for input of the identification number;

third information-providing means for providing a third guidance pattern to the user on the display means when the validity of the identification number input through the input means is confirmed and for maintaining said third guidance pattern on the display means until the ordinary transaction is input through the input means, said third guidance pattern including information for selection of the ordinary transaction mode; and fourth information-providing means for providing a fourth guidance pattern to the user on the display means when the ordinary transaction command is input through the input means, said fourth guidance pattern including information for input of the withdrawal amount.

12. A control system for an automatic transaction machine according to claim 7, further comprising;

a transaction-checking means for communicating with a host computer to determine whether a transaction selected by said control system is permissible after the withdrawal amount within the predetermined limit for the quick transaction mode or the withdrawal amount for the ordinary transaction mode is input through the input means.

* * * * *